4486
El Dora Louis,
Adm'x &c of La Fayette Louis, dec'd.
Tremolo for Melodeon.
2 sheets - Sheet 1.
REISSUED JUL 25 1871
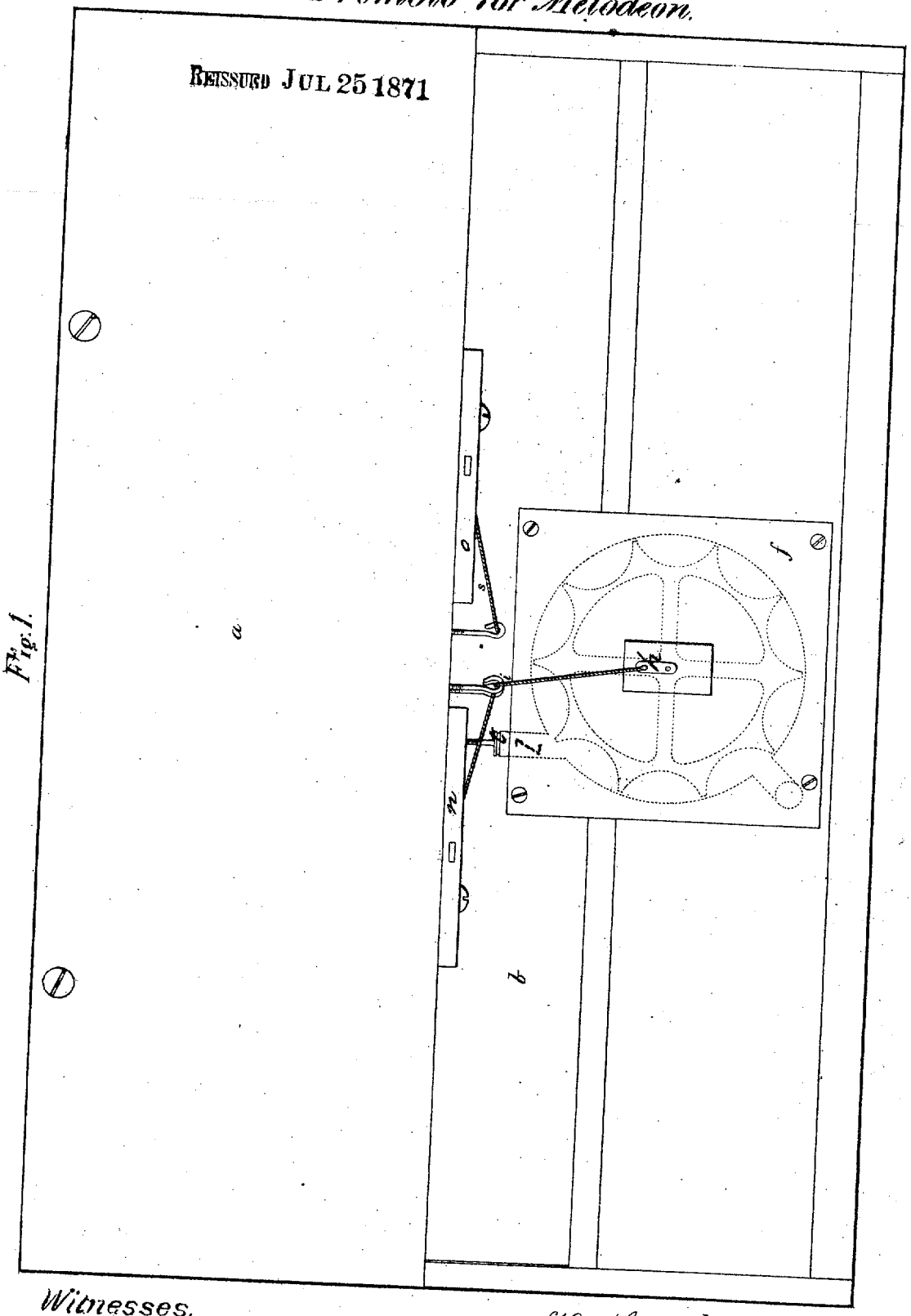
Witnesses.
Wm Anderson
E. H. Bates.
El Dora Louis Inventor.
Admr. of the Estate of
La Fayette Louis, deceased.
Chapman Herrmann & Co
Attys.
AM. PHOTO-LITHOGRAPHIC CO. N.Y. (OSBORNE'S PROCESS.)

El Dora Louis
Adm'x &c of La Fayette Louis, dec'd.
Tremolo for Melodeon.
2 Sheets - Sheet
4486
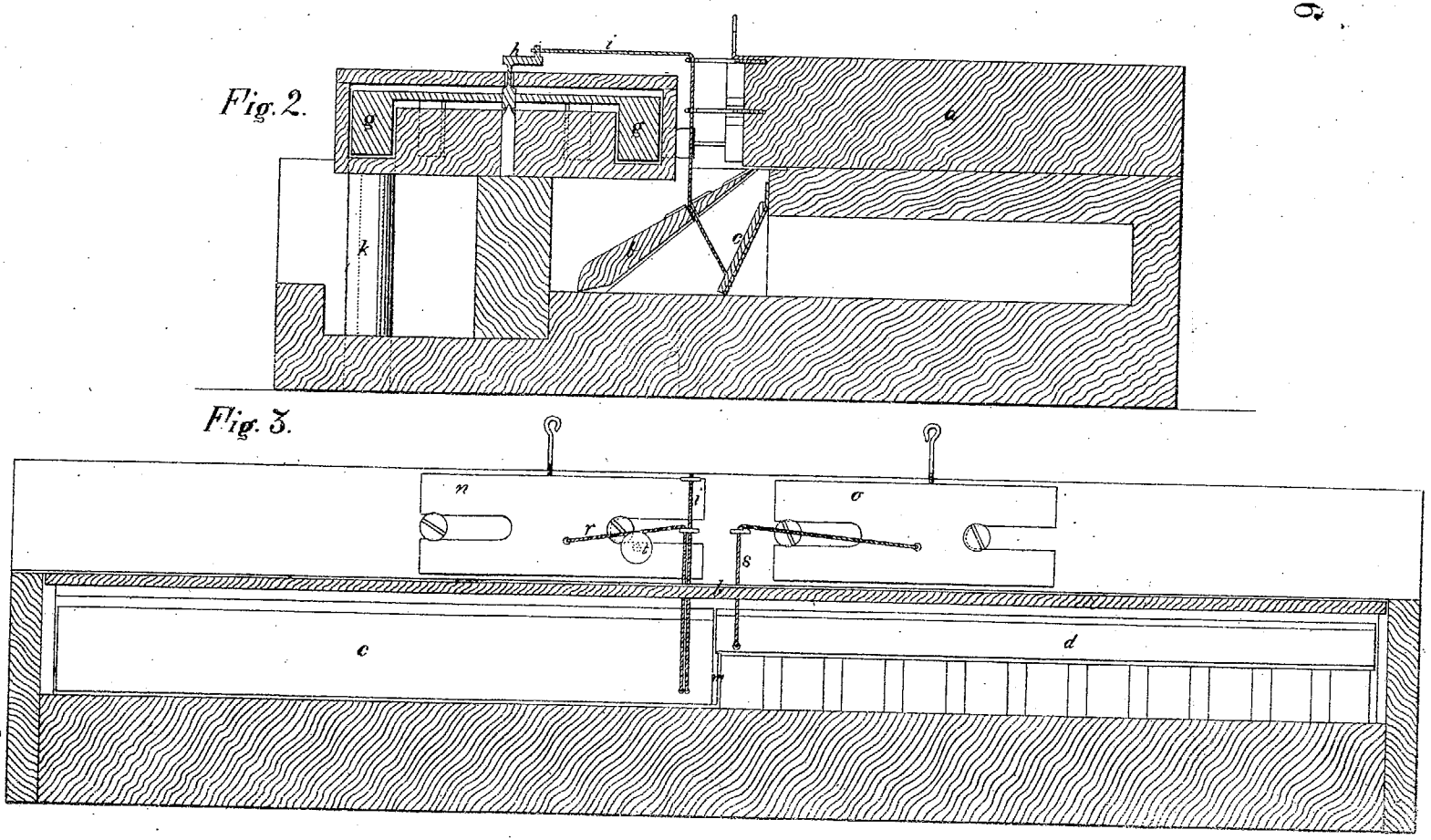
Witnesses.
Villette Anderson.
E. H. Bates
El Dora Louis,
Adm'x of the Estate of
La Fayette Louis, deceased.
Inventor.
Chipman & Osmer & Co atty's
A.M. PHOTO-LITHOGRAPHIC CO. N.Y. (OSBORNE'S PROCESS.)

UNITED STATES PATENT OFFICE.

EL DORA LOUIS, OF NEW YORK, N. Y., ADMINISTRATRIX OF LA FAYETTE LOUIS, DECEASED.

IMPROVEMENT IN MELODEONS.

Specification forming part of Letters Patent No. 16,094, dated November 18, 1856; reissue No. 2,498, dated February 26, 1867; reissue No. 2,944, dated May 26, 1868; extended seven years; reissue No. 4,486, dated July 25, 1871.

*To all whom it may concern:*

Be it known that LA FAYETTE LOUIS, deceased, formerly of Providence, in the county of Providence and State of Rhode Island, did invent an Improvement in Melodeons; and the following, taken in connection with the drawing which accompanies and forms part of this specification, is a description of the invention sufficient to enable those skilled in the art to practice it.

This invention has relation to certain improvements in melodeons, (or that class of reed instruments in which the air is drawn through the reeds by exhaust or rarefaction thereof, in contradistinction to those instruments in which the air is driven through the reeds by pressure or condensation;) and it consists in combining therewith one or more beaters, the motion of which agitates or beats the air in such a manner as to create pulsations in the musical note or sound at rapidly and regularly-repeated intervals, thus producing an effect similar to the "tremolo" or tremulous note in the human voice. It further consists in the method of actuating the tremolo-beater by independent mechanical devices; and it also consists in so arranging a tremolo-beater in connection with the reeds and other mechanism that the pulsations of the beater, and the consequent tremulous sound, may be effected at the will of the performer, with such variations as it may be desirable to produce in the cadence or accent of the tremulous sound.

The drawing represents so much of a melodeon embodying my improvement as will enable the invention to be clearly understood.

Figure 1 represents a plan view; Fig. 2, a central vertical transverse section; Fig. 3, a vertical longitudinal section.

In the drawing, the letter *a* denotes the reed-case; *b*, the ordinary swell; *c d*, two fans, valves, or beaters placed near the reeds, and causing, by their pulsatory movement, the tremulous effect as the air passes through the reeds.

Various devices for effecting the movement of the tremolo-beaters may be employed, those illustrated in the drawing being as follows: From the beater *c*, a cord, *i*, passes through suitable guides to a crank, *h*, on the shaft of a wind-wheel, *g*, which rotates in a chamber or box, *f*, one side of which is connected with the bellows by a tube, *k*, while on the other side there is an opening or passage, *l*, for the admission of air to the wind-wheel. As the bellows are operated by the pedals, air is drawn past the beaters through the reed into the bellows, and at the same time air is drawn through the wheel-case *f* to the bellows, producing in its passage a rotation of the wind-wheel, which rotation, by turning the crank, imparts a reciprocating movement to the cord *i*, and a corresponding pulsatory movement is caused in the beater *c*, as it is alternately lifted by the cord and falls, thereby effecting the tremolo sound, as will be readily understood. When two or more beaters are employed, each may be similarly connected to and operated by the wind-wheel, or one beater, *d*, may be raised by the other, *c*, by means of a lip, *m*, on the beater *c*, fitting against a shoulder on the beater *d*, Fig. 3. By means of the cords *r s* and their sliding attachments *n o*, or other equivalent means, the beaters may be raised from the floor of the passage to the reeds and adjusted to any height therefrom, thus preventing the supply of air from being even momentarily cut off from the reeds unless it be so desired. By this simple device the rythm of the pulsating note may be varied and regulated at the will of the performer. And not only the length of the pulsations can be varied by this means, but also their sharpness or distinctness of accent. By these slides and cords the beaters may be raised sufficiently high to receive no motion whatever from the crank-wheel when no tremolo effect is desired. By attaching a damper, *t*, to the slide *n*, the mouth of the tube *l* may be partially closed when the beater *c* is not in operation, sufficient wind being admitted to the wheel to keep it slowly in rotation and ready for the instant production of the pulsations of the beater when the slide is moved forward.

What I claim as my invention, and desire to secure by Letters Patent, is—

1. In combination with the reeds of a melodeon, (or that class of instruments in which the air is drawn through the reeds by the exhaust-action of a bellows,) a tremolo-valve, fan, or beater, substantially as specified.

2. A tremolo-beater, actuated by independent mechanical devices, substantially as specified.

3. A tremolo-beater or fan, arranged to vary the length or sharpness of the pulsations by means of a stop, while playing.

4. A wind-wheel or equivalent motor for actuating tremolo mechanism, substantially as specified.

5. Pulsating mechanism, adapted, without cutting off the continuous flow of air past the pulsator, to produce in bellows instruments the tremulous note.

In testimony that I claim the above I have hereunto subscribed my name in the presence of two witnesses.

EL DORA LOUIS, *Admx., &c.*

Witnesses:

FRANK B. CURTIS,

D. D. KANE.